(12) United States Patent
Shoji et al.

(10) Patent No.: US 7,072,318 B2
(45) Date of Patent: Jul. 4, 2006

(54) CELL SEARCH DETERMINATION CIRCUIT

(75) Inventors: Teppei Shoji, Tokyo (JP); Tetsuhiko Miyatani, Tokyo (JP)

(73) Assignee: Hitachi Kokusai Electric, Inc., Tokyo (JP)

(*) Notice: Subject to any disclaimer, the term of this patent is extended or adjusted under 35 U.S.C. 154(b) by 1022 days.

(21) Appl. No.: 09/963,666

(22) Filed: Sep. 27, 2001

(65) Prior Publication Data

US 2002/0041580 A1 Apr. 11, 2002

(30) Foreign Application Priority Data

Oct. 6, 2000 (JP) .............................. 2000-308128

(51) Int. Cl.
*H04B 7/216* (2006.01)
(52) U.S. Cl. ...................................... 370/335; 370/342
(58) Field of Classification Search ..................... None
See application file for complete search history.

(56) References Cited

U.S. PATENT DOCUMENTS

| | | | | |
|---|---|---|---|---|
| 6,069,915 A * | 5/2000 | Hulbert | ....................... | 375/150 |
| 6,167,037 A * | 12/2000 | Higuchi et al. | ............. | 370/335 |
| 6,717,930 B1 * | 4/2004 | Sezgin et al. | ............... | 370/335 |
| 6,728,229 B1 * | 4/2004 | Lim | ........................... | 370/335 |
| 6,731,673 B1 * | 5/2004 | Kotov et al. | ................ | 375/145 |
| 6,738,411 B1 * | 5/2004 | Ogawa et al. | .............. | 375/130 |
| 6,822,999 B1 * | 11/2004 | Lee et al. | .................... | 375/145 |

FOREIGN PATENT DOCUMENTS

EP 0 825 737 A1 2/1998
EP 1 035 665 A1 9/2000

OTHER PUBLICATIONS

European Search Report dated Mar. 11, 2003.
Wang, et al. "Cell Search in W-CDMA", IEEE Journal on Selected Areas In Communication, vol. 18, No. 8, Aug. 2000, pp. 1470-1478, XP002224578.
Higuchi, et al. "Experiments on 3-Step Fast Cell Search Method using TSTD in W-CDMA Mobile Radio", Technical Report of IEICE, Nov. 1999, pp. 99-105, XP002907493.

* cited by examiner

*Primary Examiner*—Andrew C. Lee
*Assistant Examiner*—Soon D. Hyun
(74) *Attorney, Agent, or Firm*—McGinn IP Law Group, PLLC

(57) ABSTRACT

A cell search determination circuit is provided which is capable of reducing misdetections in the identification of a scramble code number. A mobile station in W-CDMA cellular communications confirms a scramble code identified by cell search. The cell search determination circuit includes a first finger 502 for performing correlation operation of the scramble code and a receiving signal, a second finger 501 for performing correlation operation of a first synchronous channel code and the receiving signal, an averager 503 for generating a phase vector in which noise components of an output from the first finger 502 are suppressed, a first power adder for determining and integrating a power of the first finger 502, a second power adder for determining and integrating a power of the second finger 501, a first threshold determiner 514 for outputting a threshold value corresponding to an output from the first power adder, and a comparator 515 for performing a threshold determination of an output from the second power addition means using the threshold value.

3 Claims, 10 Drawing Sheets

PSCH

CPICH

FIG. 8

| Scrambling Code Group | slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 1 | 1 | 1 | 2 | 8 | 9 | 10 | 15 | 8 | 10 | 16 | 2 | 7 | 15 | 7 | 16 |
| Group 2 | 1 | 1 | 5 | 16 | 7 | 3 | 14 | 16 | 3 | 10 | 5 | 12 | 14 | 12 | 10 |
| Group 3 | 1 | 2 | 1 | 15 | 5 | 5 | 12 | 16 | 6 | 11 | 2 | 16 | 11 | 15 | 12 |
| Group 4 | 1 | 2 | 3 | 1 | 8 | 6 | 5 | 2 | 5 | 8 | 4 | 4 | 6 | 3 | 7 |
| Group 5 | 1 | 2 | 16 | 6 | 6 | 11 | 15 | 5 | 12 | 1 | 15 | 12 | 16 | 11 | 2 |
| ... | ... | ... | ... | ... | ... | ... | ... | ... | ... | ... | ... | ... | ... | ... | ... |
| Group 60 | 5 | 10 | 12 | 5 | 5 | 12 | 8 | 9 | 7 | 6 | 7 | 8 | 11 | 11 | 9 |
| Group 61 | 5 | 13 | 15 | 15 | 14 | 8 | 6 | 7 | 16 | 8 | 7 | 13 | 14 | 5 | 16 |
| Group 62 | 9 | 10 | 13 | 10 | 11 | 15 | 15 | 9 | 16 | 12 | 14 | 13 | 16 | 14 | 11 |
| Group 63 | 9 | 11 | 12 | 15 | 12 | 9 | 13 | 13 | 11 | 14 | 10 | 16 | 15 | 14 | 16 |
| Group 64 | 9 | 12 | 10 | 15 | 13 | 14 | 9 | 14 | 15 | 11 | 11 | 13 | 12 | 16 | 10 |

US 7,072,318 B2

CELL SEARCH DETERMINATION CIRCUIT

BACKGROUND OF THE INVENTION

1. Field of the Invention

This invention relates to a cell search determination circuit for a mobile station in W-CDMA (Wideband-Code Division Multiple Access) cellular communications.

2. Description of the Related Art

Cell search in a W-CDMA system is an initial synchronization acquisition function to identify a scramble code number at a mobile station, wherein receiving timing is detected and a scramble code group is identified in a primary synchronization channel (PSCH) and a secondary synchronization channel (SSCH) for symbols without scramble codes (mask symbols), and then a scramble code number is identified in a common pilot channel (CPICH).

Hereinafter, a frame structure of each channel employed for cell search will be explained. FIG. 7 shows a structure of the PSCH and the SSCH. One frame, which is a collection of 15 slots, is 10 msec. A base station transmits one symbol of the PSCH and the SSCH at the head position of each slot, with a length of 256 chips per symbol at a fixed period.

In the PSCH, a common code $ac_p$ is employed in the entire W-CDMA system. In the SSCH, sixteen kinds of codes are arranged in a certain arrangement $ac_s^{nm}$ at each slot. FIG. 8 illustrates an example of a table of the SSCH code number arrangement, in which n and m correspond to scramble code group numbers (Group 1 to 64) and slot numbers (#0 to 14) respectively. In the CPICH, known pilot patterns are transmitted at 15 kbps.

FIG. 9 shows a structure of a scramble code. For a scramble code in cell search, 512 primary codes 16×0, 16×1, . . . , 16×511 from Set #1 (0 to 15), Set #2 (16 to 31), . . . , Set #512 (8176 to 8189) each of which is a collection of 16 kinds of codes are employed. The 512 codes are divided into 64 groups with 8 codes per a group. Each scramble code group is arranged in the SSCH code pattern as shown in FIG. 8. Therefore, by detecting these codes, a mobile station can identify a scramble code group number and detect the receiving timing (frame timing) of a scramble code.

FIG. 10 is a flow chart of a known cell search method. At STEP I, slot timing is detected using the PSCH (101). STEP I will be now described.

FIG. 11 is a block diagram showing a structure of STEP I. A receiving signal is applied to a matched filter (MF) 801, wherein a correlation operation at each timing is sequentially performed. To the MF 801, diffusion code PSCH codes, which are commonly employed in W-CDMA systems, are applied. As shown in FIG. 7, at the PSCH, one symbol exists in a slot, so that the correlation operation of a receiving signal and PSCH codes in plural slot sections is performed, with the result that the self-correlation of the PSCH is outputted at a slot period. To reduce phase fluctuations, the output from the MF 801 is averaged at slot intervals in plural slot sections in a power adder 802. The average operation means a power addition average. With this average operation, receiving power, which results from self-correlation of the PSCH at a slot period, increases. In addition, the level ratio also increases, since noise components do not have any periodicity and they are suppressed. Slot timing detector 803 detects slot timing, which is necessary to perform a correlation operation of diffusion code SSCH codes at STEP II based on the average result of the power adder 802.

Next, at STEP II, a scramble code group is identified and frame timing is detected using the SSCH. Hereinafter, STEP II will be described.

FIG. 12 is a block diagram showing a structure of STEP II. A receiving signal is applied to a finger 901 having seventeen fingers. To each finger of the finger 901, the PSCH code and all of the sixteen kinds of SSCH codes (1 to 16) are applied. Both of the PSCH and SSCH are transmitted from a base station at a slot period, and the finger 901 performs a correlation operation at the slot timing detected in STEP I and outputs the self-correlation results of the PSCH and SSCH. In the SSCH, the SSCH code number arrangement is determined by scramble code group numbers and slot numbers, so that the self-correlation result of one of the sixteen kinds of SSCH codes is outputted. The other SSCH codes are considered as noise components.

The PSCH is employed for vector adjustment of the SSCH. To reduce phase fluctuations, as in the case of the STEP I, the output from the finger 901 is averaged at each frame in plural slot sections in a voltage adder 902. This average operation means a voltage addition average of I, Q phases in a complex I, Q plane. A comparator 903 compares the average result generated by the voltage adder 902 with the SSCH code number arrangement table shown in FIG. 8. In an identifier of group number 904, frame timing detection and identification of a scramble code group number, which are necessary for a CPICH correlation operation at STEP III, are performed.

At this point, a determination is made whether frame timing detection and identification of a scramble code group number could be performed (103). If the identification is not successful (103, NO), slot timing detection at STEP I is considered to be failed, returning to STEP I (101) to resume cell search. If the identification is successful (103, YES), the process proceeds to STEP III (104).

Next, at STEP III, a scramble code number is identified with the CPICH (104). STEP III will be now described.

FIG. 13 is a block diagram showing the configuration of STEP III. A receiving signal is applied to a finger 1001 having eight fingers. To each finger in the finger 1001, scramble code candidates (0 to 7) including all of the eight kinds of CPICH are applied. The finger 1001 performs the CPICH correlation operation at the frame timing detected at STEP II, and outputs a self-correlation result for one of the eight kinds of scramble code candidates. The other scramble code candidates are considered as noise components.

To reduce noise, as in the case of STEP II, outputs from the finger 1001 are averaged at each frame in plural slot sections in a voltage adder 1002. An identifier of scramble code number 1003 identifies the maximum value of the average results generated by the voltage adder 1002 as a scramble code number.

Next, to reduce missynchronization at STEP III, confirmation is performed with a threshold value using the CPICH (105). The confirmation with a threshold value will be now described.

FIG. 14 is a block diagram showing the configuration of a conventional cell search determination circuit. A receiving signal received in an antenna 401 and a CPICH code are applied to a finger 402. The finger 402 transmits a self-correlation output of the CPICH to a power adder 403 at a symbol period.

At a comparator 404, output from the power adder 403 is compared with the level of a threshold value. Then, the comparator 404 determines whether the output from the power adder 403 exceeds the threshold value (106). The threshold value employed here is a fixed value. If the output from the power adder 403 is below the threshold value (106, NO), identification of a scramble code is considered to be failed at STEP III. Then, the process proceeds to 107, where a determination is made whether continuous identifications of the scramble code number are failed (107), if not so (107, NO), the cell search is resumed from the identification of a scramble code at STEP III (104). If the continuous identifications of the scramble code number is failed (107, YES), detection of slot timing at STEP I is considered to be failed, returning to STEP I (101) to resume cell search. If the output from the power adder 403 exceeds the threshold value, cell search is completed. As described above, by repeating the process of the flow chart in FIG. 10 at a mobile station, a scramble code from a base station is confirmed.

However, in the conventional cell search determination circuit, the threshold value, which is employed for level comparing with the output from the power adder 403, is a fixed value in a comparator 404. Therefore, the comparator 404 cannot accommodate output fluctuations, which is generated by phase fluctuations, in the power adder 403, so that misdetection occurs. If the fail rate of confirmation increases, the cell search is performed again, increasing the cell search time. In addition, if misdetection occurs, a mobile station can not connect to a base station, leading to serious problems.

SUMMARY OF THE INVENTION

The present invention is intended to obviate the problems as referred to above, and has for its object to provide a cell search determination circuit capable of reducing misdetections in the identification of a scramble code number and saving search time.

Bearing the above object in mind, according to a first aspect of the present invention, there is provided a cell search determination circuit wherein a mobile station in W-CDMA cellular communications confirms a scramble code identified by cell search, the cell search determination circuit comprising; first correlation means for correlating the scramble code and a receiving signal; second correlation means for correlating a first synchronous channel code and the receiving signal; average operation means for generating a phase vector in which noise components of an output from the first correlation means are suppressed; first power addition means for acquiring a power of the first correlation means using the phase vector and performing integration; second power addition means for acquiring a power of the second correlation means using the phase vector and performing integration; threshold operation means for outputting a threshold value corresponding to an output from the first power addition means; and comparison means for making a threshold determination of an output from the second power addition means using the threshold value.

With this arrangement, misdetections in the cell search determination circuit can be decreased, and hence a confirmation failure rate becomes smaller, reducing the number of times for cell search and cell search time.

In a preferred form of the first aspect of the present invention, the threshold operation means outputs a threshold value based on a transmission level ratio of the first synchronous channel code to the scramble code.

Thus, it is possible to decrease misdetections in the cell search circuit, thereby improving detection accuracy.

According to a second aspect of the present invention, there is provided a cell search determination circuit wherein a mobile station in W-CDMA cellular communications confirms a scramble code identified by cell search, the cell search determination circuit comprising: first correlation means for correlating the scramble code and a receiving signal; second correlation means for correlating a first synchronous channel code and the receiving signal; third correlation means for correlating a second synchronous channel code and the receiving signal; average operation means for generating a phase vector in which noise components of an output from the first correlation means are suppressed; first power addition means for acquiring a power of the first correlation means using the phase vector and performing integration; second power addition means for acquiring a power of the second correlation means using the phase vector and performing integration; third power addition means for acquiring a power of the third correlation means using the phase vector and performing integration; second threshold operation means for outputting a second threshold value corresponding to an output from the second power addition means; first comparison means for making a threshold determination of an output from the third power addition means using the second threshold value; first threshold operation means for outputting a first threshold value corresponding to an output from the first power addition means; and second comparison means for making a threshold determination of an output from the first comparator using the first threshold value.

With this arrangement, misdetections caused by signal interference can be reduced, thus improving detection accuracy.

According to a third aspect of the present invention, there is provided a cell search determination circuit wherein a mobile station in W-CDMA cellular communications confirms a scramble code identified by cell search, and wherein a first delay profile using a first synchronous channel code, which is common to all base stations, and a second delay profile using the scramble code identified by the cell search, are employed to reduce the number of times for the cell search by removing paths from the base stations, which have been identified by the cell search and shown in the second delay profile, among paths from all base stations shown in the first delay profile.

Thus, the cell search for the same scramble code components as the identified scramble code can be omitted, so that the number of times for cell search identification is reduced, saving search time.

In a preferred form of the third aspect of the present invention, the cell search determination circuit includes RAKE receiving means for synthesizing paths from the same base stations, wherein a threshold determination is made based on an output from the RAKE receiving means.

Thus, a threshold determination is performed based on the result of improved receiving sensitivity, so that the confirmation accuracy for scramble code identification is improved and search time is saved.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 8 illustrates an example of an SSCH code number arrangement table;

DESCRIPTION OF THE PREFERRED EMBODIMENTS

Hereinafter, preferred embodiments of the present invention will be described in detail while referring to the accompanying drawings.

The First Embodiment

Figure 1:
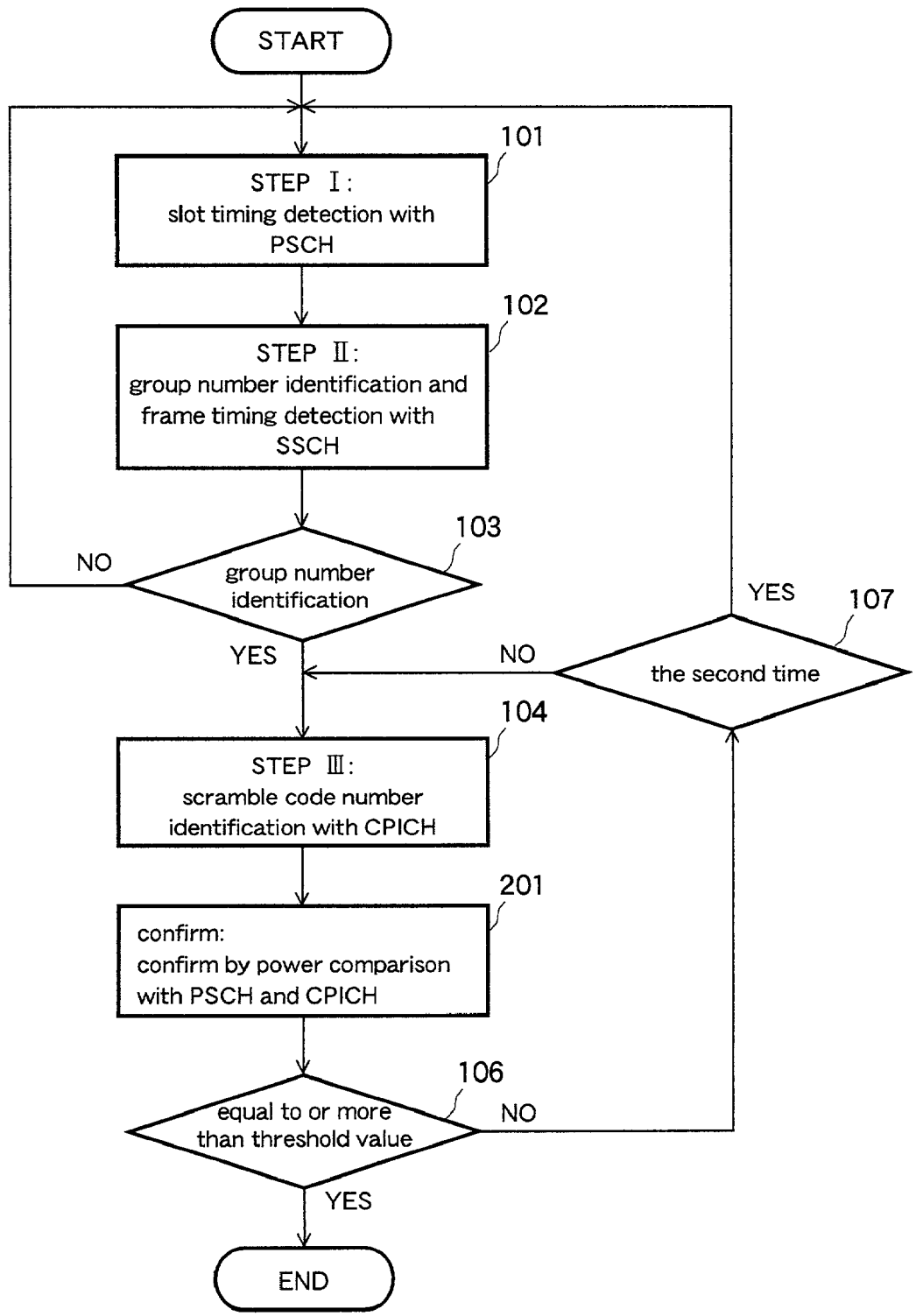
FIG. 1 is a flow chart illustrating a cell search method according to a first embodiment of the present invention.
Figure 10:
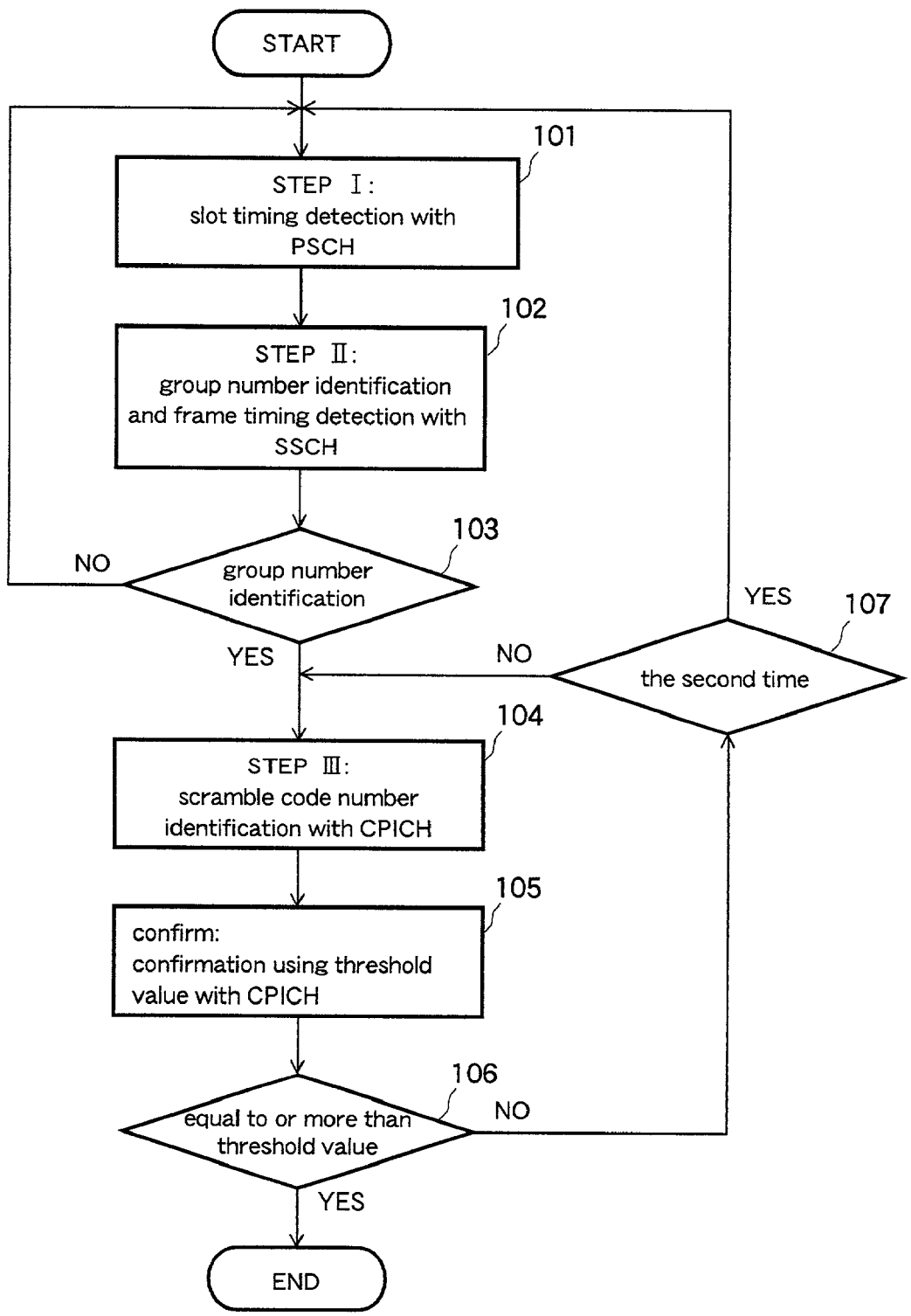
FIG. 10 is a flow chart illustrating a known cell search method.
Figure 11:
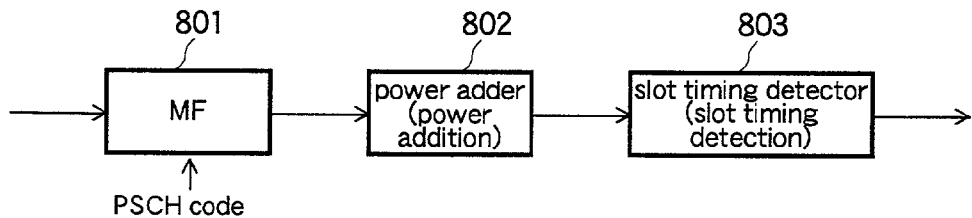
FIG. 11 is a block diagram of a configuration of STEP I.
Figure 12:
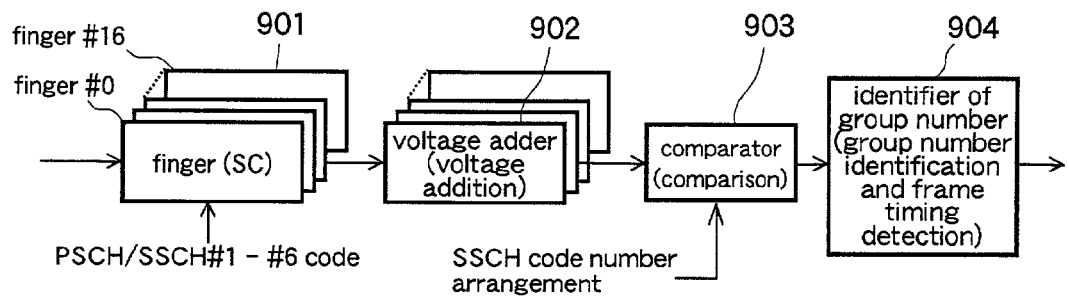
FIG. 12 is a block diagram of a configuration of STEP II.
Figure 13:
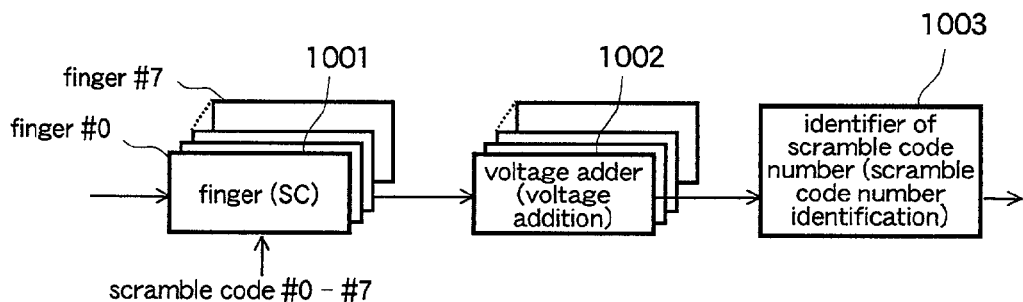
FIG. 13 is a block diagram of a configuration of STEP III.
Figure 14:
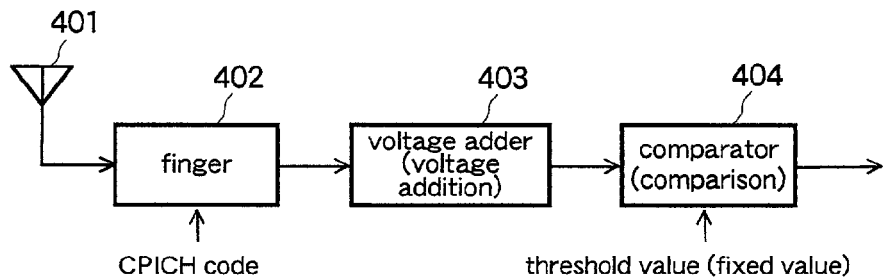
FIG. 14 is a block diagram of a known cell search determination circuit.

FIG. 1 illustrates a flow chart of a cell search method according to a first embodiment of the present invention. The same codes as shown in FIG. 10 designate the same or corresponding items, and explanation for them is omitted here. In this embodiment, confirmation (201) is performed by power comparison using both PSCH and CPICH, instead of confirmation (105) according to a threshold value using CPICH as shown in FIG. 10. A cell search determination circuit according to the first embodiment of the present invention will be described below.

Figure 2:
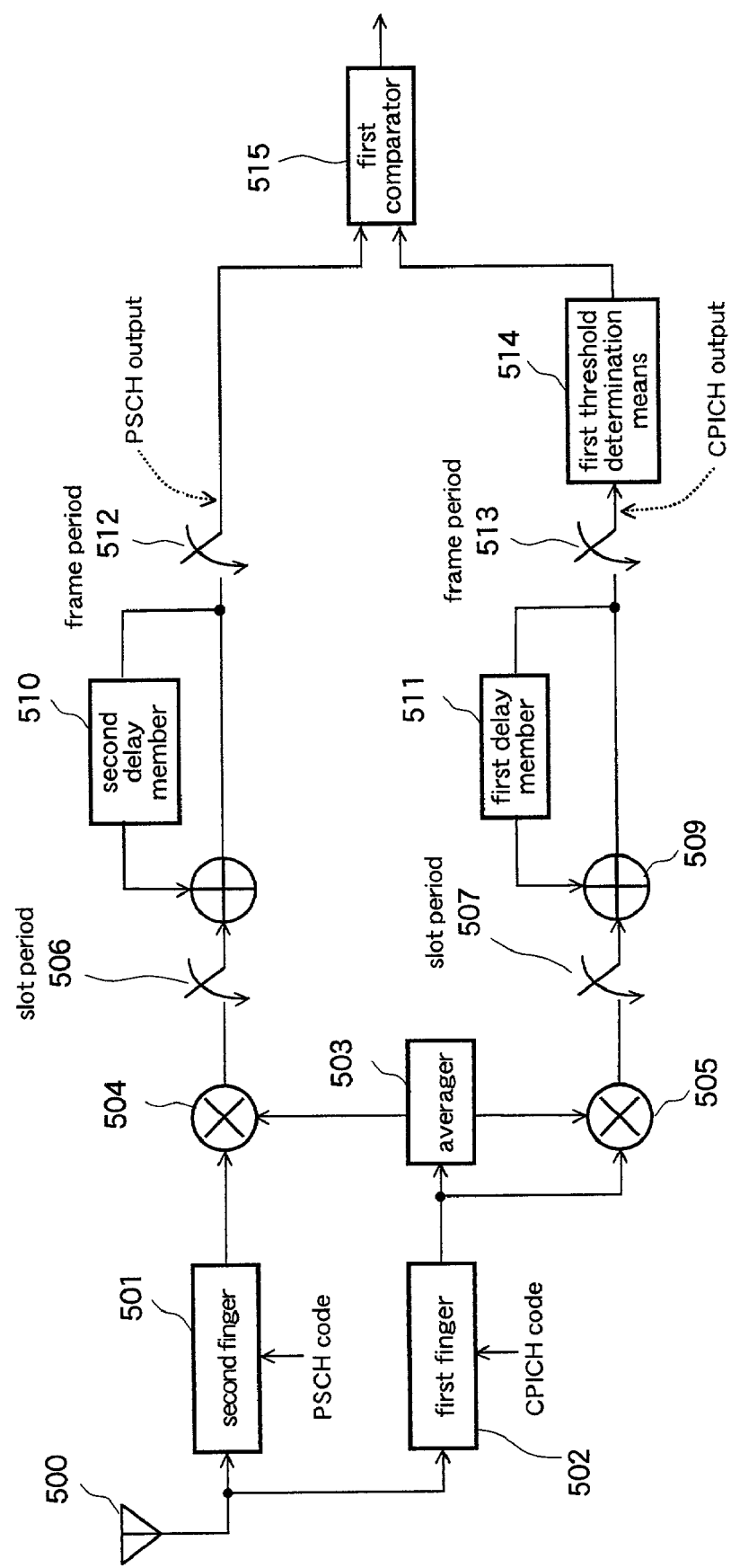
FIG. 2 is a block diagram of a cell search determination circuit according to the first embodiment.

FIG. 2 illustrates a block diagram of a cell search determination circuit according to the first embodiment of the present invention. A receiving signal, which is received by an antenna 500, is applied to a second finger 501 and a first finger 502. Also, to the second finger 501, a PSCH code, which is commonly employed in a W-CDMA system, is applied, and to the first finger 502, a CPICH code is applied. The second finger 501 outputs a self-correlation result of PSCH to a second complex multiplier 504 at a symbol period. The first finger 502 outputs a self-correlation result of CPICH to an averager 503 and a first complex multiplier 505 at a symbol period.

The averager 503 performs an average operation for the output of the first finger 502 for a predetermined time. The average operation is a voltage addition average of I, Q phases in a complex I, Q plane. The output from the averager 503 is a phase vector indicating phase fluctuations, in which noise components are suppressed by the average operation.

Power addition operation in the PSCH will be now described. The second complex multiplier 504 performs synchronous detection using the phase vector outputted from the averager 503. A third switch 506 transmits the output from the second complex multiplier 504 to a second adder 508 at a slot period. The second adder 508 adds the output from a second delay member 510, which contains the output from the second adder 508 for a predetermined time, to the output from the third switch 506, and transmits the result to the second delay member 510 and a fourth switch 512. The fourth switch 512 transmits the output from the second adder 508 to a first comparator 515 (PSCH output).

Power addition operation in the CPICH will be now described. The first complex multiplier 505 performs synchronous detection using the phase vector outputted from the averager 503. A first switch 507 transmits the output from the first complex multiplier 505 to a first adder 509 at a slot period. The first adder 509 adds the output from a first delay member 511, which contains the output from the first adder 509 for a predetermined time, to the output from the first switch 507, and transmits the result to the first delay member 511 and a second switch 513. The second switch 513 transmits the output from the first adder 509 to a first threshold determination means 514 at a frame period (CPICH output).

Figure 6:
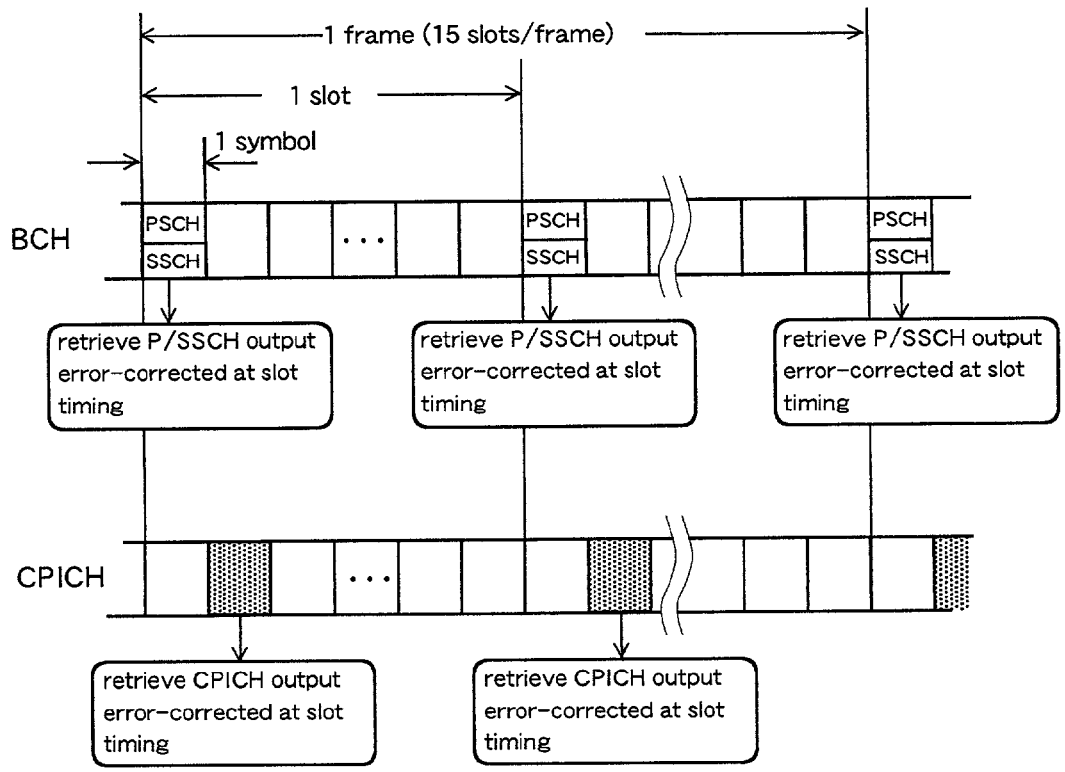
FIG. 6 illustrates a frame structure and switching timing.
Figure 7:
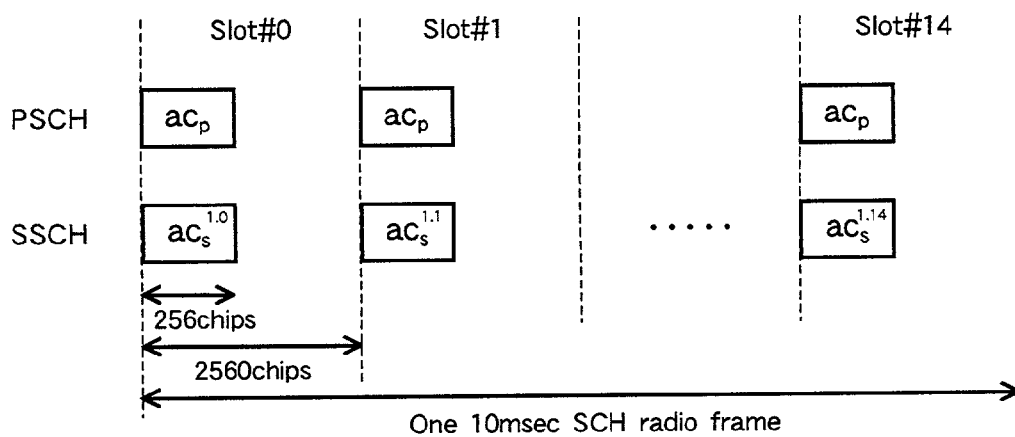
FIG. 7 illustrates a structure of PSCH and SSCH.
Figure 9:
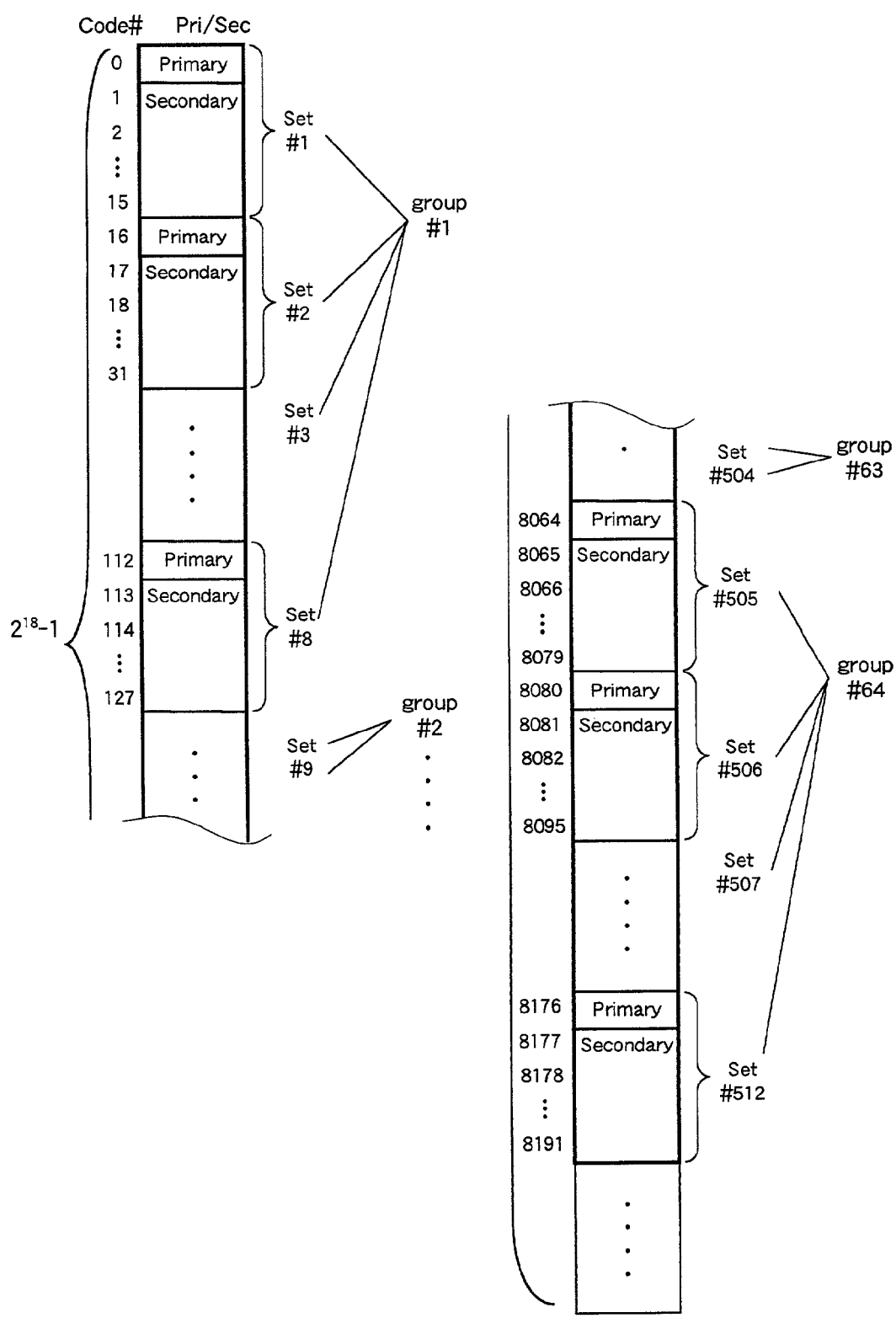
FIG. 9 illustrates a configuration of a scramble code.

FIG. 6 illustrates a frame structure and switch timing. The third switch 506 retrieves the PSCH output at slot period timing as shown in FIG. 6. The timing, in which the first switch 507 retrieves the CPICH output, may be any slot period timing as shown in FIG. 6. The first threshold determination means 514 transforms the CPICH output into a threshold value according to a threshold determination constant, and outputs the result to the first comparator 515. The first comparator 515 compares the PSCH output with the output from the first threshold determination means 514. If the PSCH output is equal to or greater than the threshold value (106, YES), the cell search is completed.

For both of the PSCH and CPICH outputs, the synchronous detection is performed using the phase vector. Therefore, the transmission level ratio of the PSCH output acquired at a mobile station to the CPICH output becomes a constant value (threshold value) set in a base station independent of phase fluctuations. In addition, the threshold value follows the phase fluctuations, so that misdetections in a cell search determination circuit can be reduced in comparison with the prior art wherein the threshold value is a fixed value. As a result, compared with conventional techniques, misconfirmation rate becomes smaller, allowing the number of times for cell search and cell search time to decrease.

The Second Embodiment

In a second embodiment of the present invention, considering that the transmission level ratio of the PSCH to the CPICH (PSCH/CPICH) is −3 dB, the threshold determination value of the transmission level ratio equal to −3 dB is provided to the output from the CPICH, which is used as the threshold value for the PSCH output in the threshold determination means 514 in the first embodiment. Also, the threshold value is provided with an allowable range (threshold range). The comparator 515 compares the PSCH output with the output from the threshold determination means 514. If the PSCH output is within the threshold value±the threshold range, the cell search is completed.

In addition, at a base station, the transmission level ratio of the PSCH to the CPICH can be freely set regardless of −3 dB. A mobile station in advance recognizes this information, so that the threshold value is varied corresponding to the transmission level ratio. The cell search determination circuit in the first embodiment completes the cell search when the threshold value is exceeded. Therefore, even if the PSCH output is slightly below the threshold value, the determination circuit recognizes misdetection and resumes cell search although a mobile station has detected scramble code of a target base station in STEP I to STEP III. In this embodiment, the threshold value is provided with an allowable range (threshold range) for reducing misdetections. Furthermore, higher detection accuracy can be achieved compared with the cell search determination circuit in the first embodiment.

The Third Embodiment

In a third embodiment of the present invention, instead of confirmation with the threshold value using CPICH (105) in FIG. 10, confirmation with SSCH, PSCH, and CPICH is performed. A cell search determination circuit in this embodiment will be now described.

Figure 3:
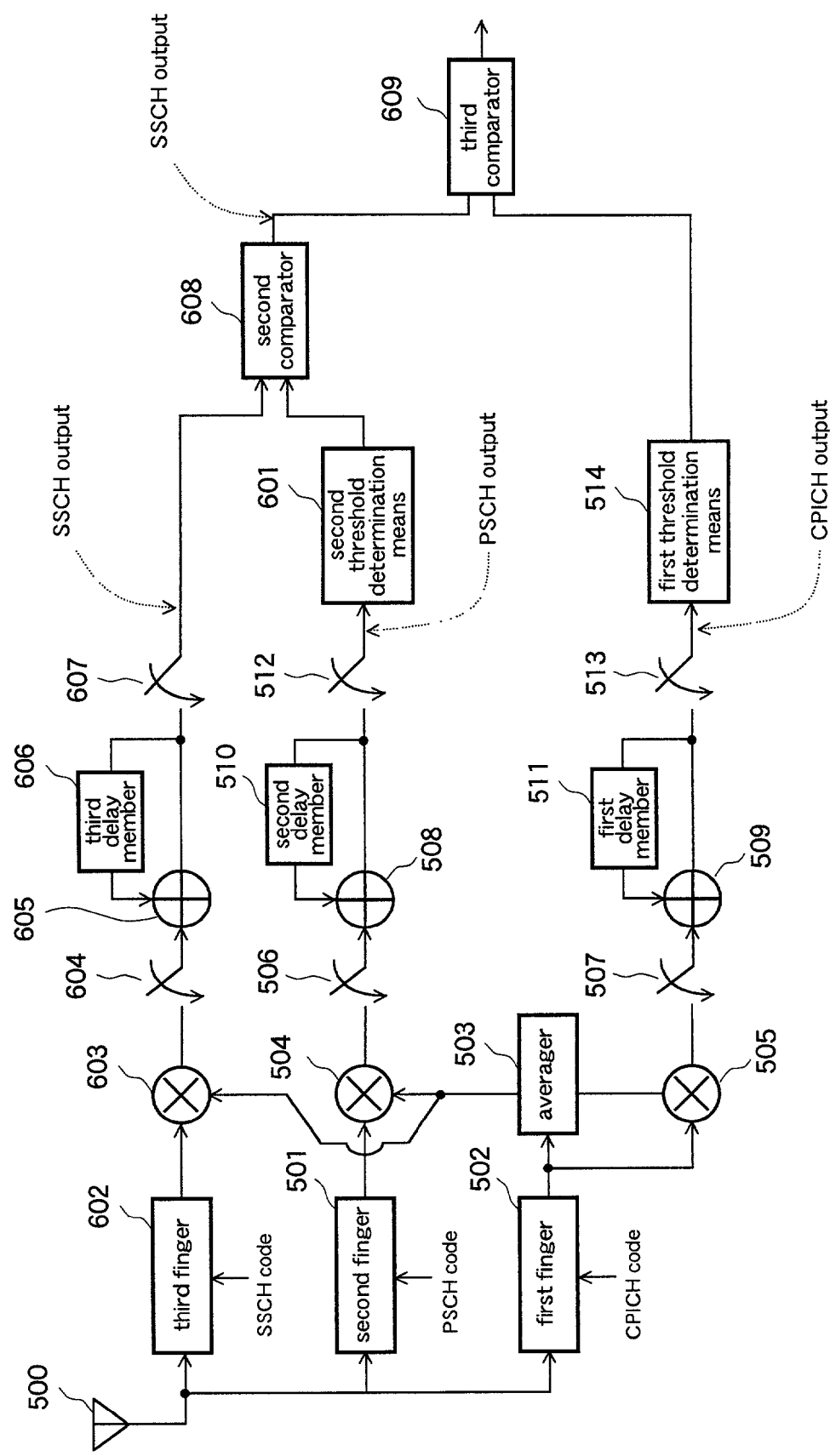
FIG. 3 is a block diagram of a cell search determination circuit according to a third embodiment of the present invention.

FIG. 3 illustrates a block diagram of a cell search determination circuit in the third embodiment. The same reference symbols as those shown in FIG. 2 denote like or corresponding elements, and description of them will be omitted. A receiving signal received by the antenna 500 is applied to a third finger 602, the second finger 501, and the first finger 502. To the third finger 602, SSCH codes are applied. The third finger 602 transmits the self-correlation result of SSCH to a third complex multiplier 603 at a symbol period.

Next, power addition operation of SSCH will be described. The third complex multiplier 603 performs synchronous detection using the output from the averager 503, and a fifth switch 604 outputs the result to a third adder 605 at a slot period. The third adder 605 adds the output from a third delay member 606, which contains the output from the third adder 605 for a predetermined time, to the output from the fifth switch 604, and transmits the result to the third delay member 606 and a sixth switch 607. The sixth switch 607 transmits the result from the third adder 605 to a second comparator 608 at a frame period (SSCH output).

In this embodiment, at the output side of the fourth switch 512 in the first embodiment, a second threshold determination means 601 is inserted. The second threshold determination means 601 transforms the output from the fourth switch 512 (PSCH output) into a threshold value according to a threshold constant value, and outputs the result to the second comparator 608. The second comparator 608 compares the output from the second threshold determination means 601 with the SSCH output. If the SSCH output falls within the threshold value±a threshold value range, the scramble code group identification in STEP II is confirmed to be successful and the SSCH output is transmitted. A third comparator 609 compares the output from the first threshold determination means 514 with the SSCH output. If the SSCH output falls within the threshold value±a threshold value range, the cell search is completed.

A base station multiplexes the frame structured BCH and CPICH shown in FIG. 6 and other signals, and then transmits it. Among the signals transmitted from the base station, the PSCH and SSCH are diffused by a different method than other signals. The multiplexed signals having the same timing as the PSCH and SSCH are deteriorated by signal interference. The misdetection due to the deterioration caused by signal interference may occur at the cell search determination circuit in the first embodiment. With the PSCH and SSCH outputs having the same level of deterioration caused by signal interference, the level comparison using a threshold value can be performed taking into consideration the amount of deterioration. As described above, compared with the cell search determination circuit in the first embodiment, detection accuracy can be increased by reducing misdetections due to signal interference.

The Fourth Embodiment

Figure 4:
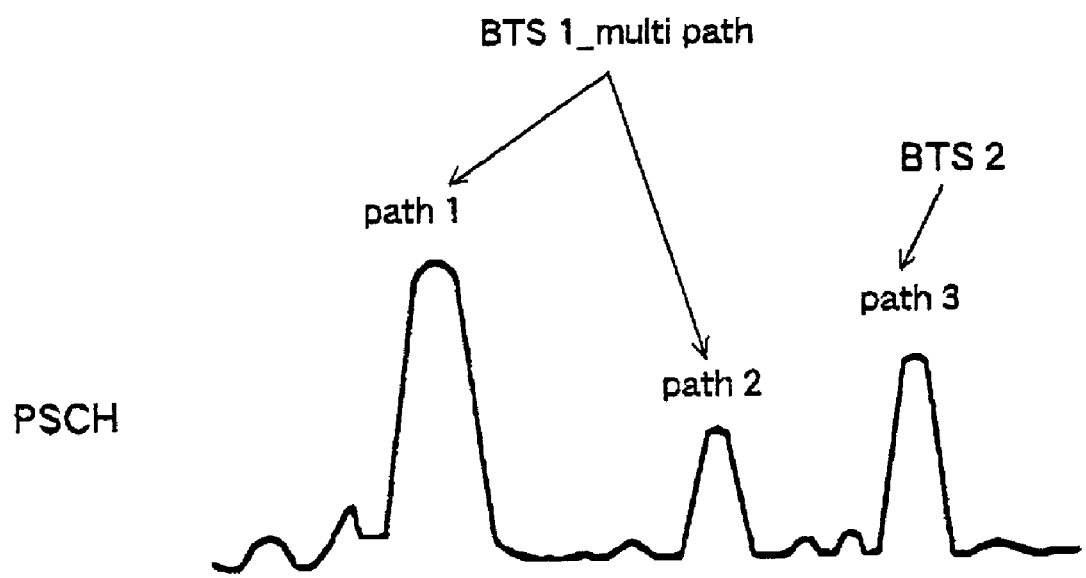
FIG. 4 illustrates an example of delay profile results.
Figure 4:
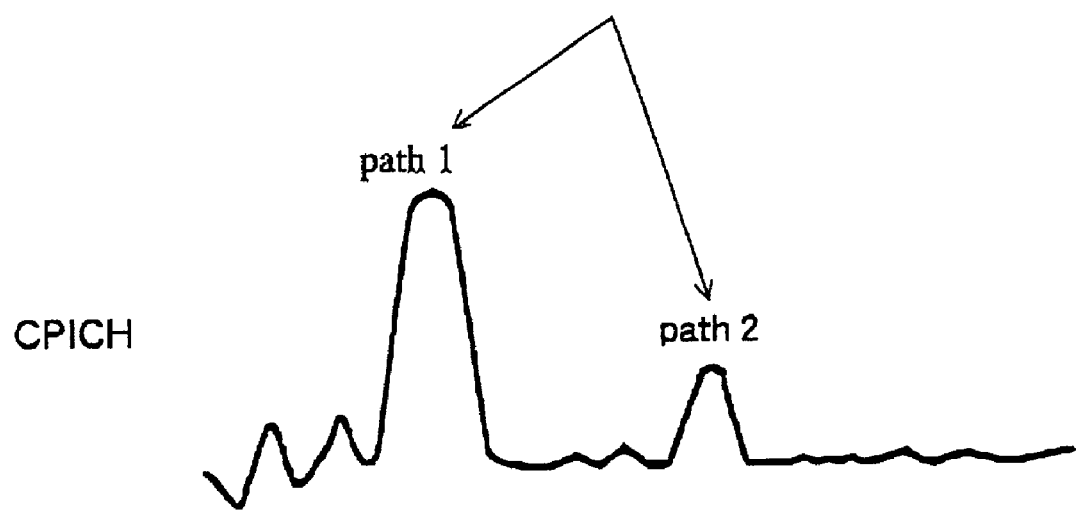

FIG. 4 illustrates an example of a delay profile result. In a fourth embodiment of the present invention, the number of base stations is limited to two, i.e., a main base station 1, which is a cell search target station, and its adjacent base station. However, any number of base stations is possible.

In STEP I, if the delay profile of the PSCH is outputted, each path of the base stations 1, 2 (BTS 1, BTS 2) is detected because the PSCH is common to all base stations (base stations 1, 2). Also, if the delay profile of the CPICH is outputted using the scramble code number detected after STEP III, paths of only the BTS 1 are detected as shown in FIG. 4. Next, the delay profiles of the PSCH and CPICH are compared, and then the same scramble code components are specified. Thus, the paths from the same base station detected using the CPICH are removed from the paths detected using the PSCH.

Since the cell search determination circuit in the first embodiment can not specify path positions from the same base station, the cell search must be repeated as many times as the number of path positions detected in STEP I. However, in this embodiment, the same scramble code components are specified, so that omitting the cell search of the same scramble code components can reduce the number of times for cell search identification. Therefore, compared with the cell search determination circuit in the first embodiment, search time can be reduced.

The Fifth Embodiment

Figure 5:
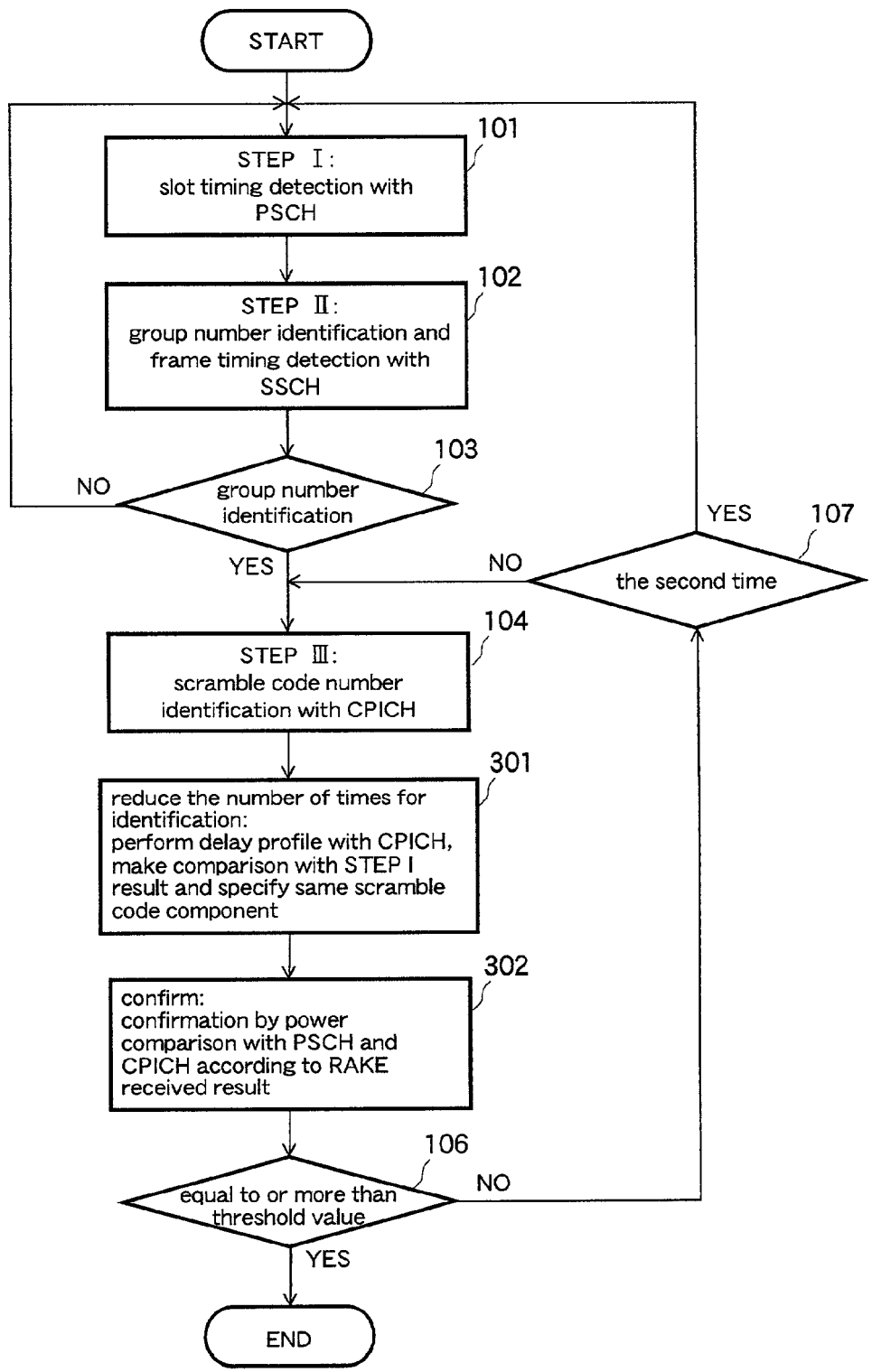
FIG. 5 is a flow chart illustrating a cell search method according to a fifth embodiment of the present invention.

FIG. 5 illustrates a flow chart of a cell search method according to a fifth embodiment of the present invention. The same reference symbols as those shown in FIG. 10 denote like or corresponding elements, and description of them will be omitted. In this embodiment, after STEP III in FIG. 10, as described in the fourth embodiment, the delay profiles of the PSCH and CPICH are compared, and then the same scramble code components are specified to reduce the number of times for identification (301). Next, confirmation by power comparison using the PSCH and CPICH is performed according to RAKE reception results (302). In this embodiment, delay paths at the same base station are synthesized in the cell search determination circuit, and then threshold determination is perform based on the result having increased receiving sensitivity. Therefore, compared with the cell search determination circuit in the fourth embodiment, the confirmation accuracy in scramble code identification is increased, saving search time.

As described above, the cell search determination circuit according to the present invention can decrease misdetections in scramble code number identification and save search time as well.

While the invention has been described in terms of preferred embodiments, those skilled in the art will recognize that the invention can be practiced with modifications within the spirit and scope of the appended claims.

What is claimed is:

1. A cell search determination circuit, wherein a mobile station in W-CDMA cellular communications confirms a scramble code identified by cell search, comprising:
   first correlation means for correlating the scramble code and a receiving signal;
   second correlation means for correlating a first synchronous channel code and the receiving signal;

average operation means for generating a phase vector in which noise components of an output from the first correlator are suppressed;

first power addition means for acquiring a power of the first correlation means using the phase vector and performing integration;

second power addition means for acquiring a power of the second correlation means using the phase vector and performing integration;

threshold operation means for outputting a threshold value corresponding to an output from the first power addition means; and comparison means for making a threshold determination of an output from the second power addition means using the threshold value.

2. The cell search determination circuit as claimed in claim 1, wherein the threshold operation means outputs a threshold value based on a transmission level ratio of the first synchronous channel code to the scramble code.

3. A cell search determination circuit, wherein a mobile station in W-CDMA cellular communications confirms a scramble code identified by cell search, comprising:

first correlation means for correlating the scramble code and a receiving signal;

second correlation means for correlating a first synchronous channel code and the receiving signal;

third correlation means for correlating a second synchronous channel code and the receiving signal;

average operation means for generating a phase vector in which noise components of an output from the first correlation means are suppressed;

first power addition means for acquiring a power of the first correlation means using the phase vector and performing integration;

second power addition means for acquiring a power of the second correlation means using the phase vector and performing integration;

third power addition means for acquiring a power of the third correlation means using the phase vector and performing integration;

second threshold operation means for outputting a second threshold value corresponding to an output from the second power addition means;

first comparison means for making a threshold determination of an output from the third power addition means using the second threshold value;

first threshold operation means for outputting a first threshold value corresponding to an output from the first power addition means; and second comparison means for making a threshold determination of an output from the first comparator using the first threshold value.

* * * * *